Patented May 29, 1951

UNITED STATES PATENT OFFICE 2,554,736

TERTIARY AMINOALKYL-IMINODIBENZYLS

Franz Haefliger and Walter Schindler, Basel, Switzerland, assignors to J. R. Geigy A. G., Basel, Switzerland, a Swiss firm No Drawing. Application June 26, 1950, Serial No. 170,472. In Switzerland July 22, 1949

4 Claims. (Cl. 260—239)

This invention relates to a new class of organic compounds and more particularly to basic derivatives of imino dibenzyl, to their salts and quaternary ammonium compounds and includes the manufacture thereof. The new compounds correspond to the general formula:

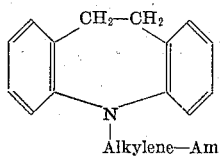

wherein alkylene and represents an alkylene chain of 2-6 carbon atoms and Am represents a low molecular dialkylamino radical (alkyl containing from 1-4 carbon atoms) or a N-piperidino-, N-morpholino-, or N-pyrrolidino radical in the $\beta$-, $\gamma$-, or $\delta$-position of the alkylene chain.

It has been found that these compounds possess valuable pharmacological properties. This, for instance, they produce anti-allergic effects and may be used for therapeutic purposes. The compounds in which Am is in the $\beta$-position of the alkylene chain are a preferred embodiment of the invention.

Imino dibenzyl is a known compound. It can be obtained by heating o.o'-diamino-dibenzyl chlorohydrate according to Thiele and Holzinger (Annalen, vol. 305, page 100 (1899)). Neither this basic compound nor any of its known derivatives have been of any therapeutic significance up to now.

The new compounds can be produced by two different, but co-related processes. Firstly imino dibenzyl can be reacted with a reactive ester of an alcohol of the general formula:

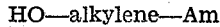
HO—alkylene—Am wherein alkylene and Am have the meaning given above, in the presence of acid binding agents. Sodium amide, lithium amide, potassium amide, sodium and potassium are suitable acid binding agents by means of which the imino dibenzyl can be advantageously converted into its alkali salt immediately before the reaction. The reaction should preferably be performed in an inert organic solvent such as benzene, toluene or xylene, by heating.

As reactive esters of an alcohol of the formula:

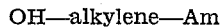
OH—alkylene—Am particularly the halide esters come into consideration such as dimethylamino ethyl chloride, diethylamino ethyl chloride, methylethylamino ethyl chloride, piperidino ethyl chloride, pyrrolidino ethyl chloride, morpholino ethyl chloride, $\beta$-dimethylamino propyl chloride, $\beta$-dimethylamino isopropyl chloride, $\gamma$-dimethylamino propyl chloride, $\alpha$-methyl-$\delta$-dimethylamino pentyl chloride, Di-n-propylamino ethyl chloride, methyl isopropylamino ethyl chloride, di-isobutylamino ethyl chloride, di-n-butylamino ethyl chloride or the corresponding bromides or iodides.

In the second process one mol of imino dibenzyl is reacted with one mol of a reactive mono- or di-ester of a glycol of the general formula:

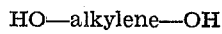
HO—alkylene—OH wherein alkylene has the meaning given above, in the presence of an acid binding agent. Then, if a mono-ester has been used, the remaining hydroxyl group is converted into a reactive ester group. The reactive ester of N-hydroxyalkyl-imino dibenzyl obtained by either of these two variants of the second process is then reacted with a secondary amine of the general formula:

Am—H wherein Am has the meaning given above.

Particularly halide esters but also aryl sulphonic acid esters and mixed di-esters come into question as reactive esters of a glycol of the general formula:

HO—alkylene—OH

Quaternary ammonium compounds can be obtained in the usual way from the tertiary amino alkyl-imino dibenzyls by the addition of halides or sulphates of aliphatic or araliphatic alcohols, e. g. methyl iodide, dimethyl sulphate, ethyl bromide or benzyl chloride. Such compounds can also be obtained, however, by the use of tertiary amines of the general formula:

R—Am wherein R represents an alkyl or aralkyl radical and Am has the meaning given above, in place of the secondary amines for the reaction with the reactive esters of N-hydroxy-alkyl-imino dibenzyls in the last step of the second process.

The tertiary bases form water soluble salts with inorganic or organic acids such as hydrochloric acid, hydrobromic acid, sulphuric acid, phosphoric acid, methane sulphonic acid, ethane disulphonic acid, acetic acid, citric acid, apple acid, succinic acid, tartaric acid, benzoic acid, phthalic acid.

The following examples illustrate the invention. Where not otherwise stated, parts are given by weight and the relationship of parts by weight to parts by volume is that of grams to cubic centimetres. Temperatures are given in degrees centigrade.

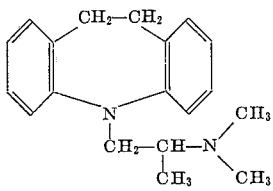

20 parts of imino dibenzyl are dissolved in 100 parts by volume of absolutely dry benzene. A suspension of 4 parts NaNH2 in 50 parts by volume of abs. benzene are then added dropwise at 50-60° after which the mixture is boiled for an hour under reflux. 13 parts of β-dimethylamino isopropyl chloride are then added dropwise at 40-50° and the mixture is boiled for 10 hours under reflux. After cooling, the benzene solution is thoroughly washed with water, whereupon the basic constituents are extracted with dilute hydrochloric acid. The hydrochloric extract is then made alkaline and the separated base is extracted with ether. After drying, the solvent is evaporated and the residue is distilled in the high vacuum, whereby the N-(β-dimethylamino propyl)-imino dibenzyl resulting from a rearrangement in the side chain passes over at a temperature of 145-146° under 0.05 mm. pressure. The chlorohydrate with a melting point of 199-200° is obtained therefrom with alcoholic hydrochloric acid.

In an analogous manner, the following compounds are prepared: N-dimethylamino ethyl imino dibenzyl (B. P. 138-140° at 0.08 mm. pressure), chlorohydrate (M. P. 216-217°) from methanol/acetic ester; N-diethylamino ethyl imino dibenzyl (B. P. 150-152° at 0.15 mm. pressure) chlorohydrate (M. P. 192-193°) from methanol/acetic ester; N-(γ-dimethylamino propyl)-imino dibenzyl (B. P. 160° at 0.1 mm. pressure) chlorohydrate (M. P. 166-168°); N-(γ-dibutylamino propyl)-imino dibenzyl (B. P. 184° at 0.1 mm. pressure); N-(β-diethylamino propyl)-imino dibenzyl (B. P. 155-156° at 0.12 mm. pressure); N-morpholino ethyl imino dibenzyl, chlorohydrate (M. P. 220-222°).

*Example 2*

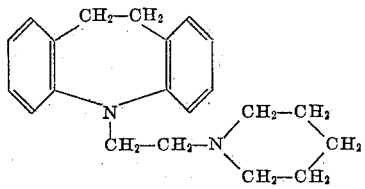

A suspension of 4 parts of sodium amide in 50 parts of abs. benzene are added dropwise at 40-50° to a solution of 20 parts imino dibenzyl in 10 parts by volume abs. benzene, after which the mixture is kept for 1 hour at 70-80°. It is then cooled to about 50°, 19 parts piperidino ethyl chloride in 40 parts by volume of abs. benzene are dropped in, after which the mixture is boiled for 10 hours under reflux. After cooling to about 5°, 30 parts by volume concentrated hydrochloric acid are added dropwise whereby the chlorohydrate of N-piperidino ethyl imino dibenzyl precipitates out. It is then filtered and recrystallised from abs. alcohol. It melts at 278-280° under decomposition.

The following compounds can be produced in analogous manner:

N-(δ-dimethylamino-butyl)-imino dibenzyl.
N-(di-n-butylamino ethyl)-imino dibenzyl.
N-pyrrolidino ethyl imino dibenzyl.

What we claim is:

1. A compound selected from the group consisting of a free base and its water soluble acid addition salts, said free base having the formula:

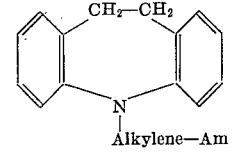

wherein alkylene represents an alkylene chain of 2-3 carbon atoms and Am represents a member selected from the group consisting of a low molecular dialkylamino radical, the N-piperidino-, N-morpholino-, and N-pyrrolidino radicals.

2. A compound selected from the group consisting of a free base and its water soluble acid addition salts, said free base having the formula:

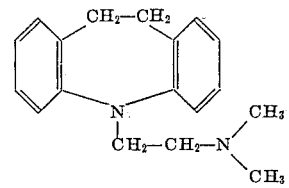

3. A compound selected from the group consisting of a free base and its water soluble acid addition salts, said free base having the formula:

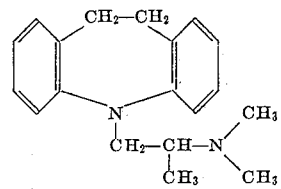

4. A compound selected from the group consisting of a free base and its water soluble acid addition salts, said free base having the formula:

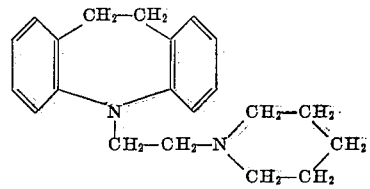

FRANZ HAEFLIGER.
WALTER SCHINDLER.

REFERENCES CITED

The following references are of record in the file of this patent:

FOREIGN PATENTS

| Number | Country | Date |
|---|---|---|
| 892,034 | France | Mar. 27, 1943 |